US006474528B2

(12) United States Patent
Scharschinger et al.

(10) Patent No.: US 6,474,528 B2
(45) Date of Patent: Nov. 5, 2002

(54) DEVICE FOR SWIVELING A ROTARY FRAME

(75) Inventors: Margrit Scharschinger, Diedorf (DE); Andreas Ostermann, Bobingen (DE)

(73) Assignee: Erhardt + Leimer GmbH, Augsburg (DE)

( * ) Notice: Subject to any disclaimer, the term of this patent is extended or adjusted under 35 U.S.C. 154(b) by 0 days.

(21) Appl. No.: 09/852,181

(22) Filed: May 9, 2001

(65) Prior Publication Data

US 2001/0040178 A1 Nov. 15, 2001

(30) Foreign Application Priority Data

May 11, 2000 (DE) .......................................... 10 22 926

(51) Int. Cl.[7] ...................... B23Q 15/007; B65H 23/038

(52) U.S. Cl. ......................... 226/180; 226/21; 226/190; 226/194; 384/490; 242/615.21

(58) Field of Search ............................. 226/21, 22, 23, 226/180, 190, 194; 242/615.21; 384/490, 8; 211/163; 248/349.1

(56) References Cited

U.S. PATENT DOCUMENTS

| | | | | | |
|---|---|---|---|---|---|
| 3,326,435 | A | * | 6/1967 | Shelton | 226/22 |
| 3,602,191 | A | * | 8/1971 | Gorton, Jr. et al. | 226/22 X |
| 3,724,732 | A | * | 4/1973 | Bonner | 226/21 |
| 4,069,959 | A | * | 1/1978 | Bartell et al. | 226/21 |
| 4,204,619 | A | * | 5/1980 | Damour | 226/21 |
| 4,342,412 | A | * | 8/1982 | Lorenz et al. | 226/21 |
| 4,477,006 | A | * | 10/1984 | Sharp | 226/21 X |
| 5,074,450 | A | * | 12/1991 | Lindner et al. | 226/21 |

FOREIGN PATENT DOCUMENTS

| | | |
|---|---|---|
| DE | 31 25 852 | 1/1983 |
| DE | 30 08 775 | 3/1984 |
| DE | 32 12 176 | 1/1988 |

* cited by examiner

*Primary Examiner*—Michael R. Mansen
*Assistant Examiner*—Minh-Chau Pham
(74) *Attorney, Agent, or Firm*—Collard & Roe, P.C.

(57) ABSTRACT

A rotary frame pivotably supported on a rack and swiveling around a swivel axis. The frame supports at least one reversing roll for moving the material web. A pivot bearing in the form of an antifriction bearing is cut as a segment so that the material web can run close to the swivel axis.

10 Claims, 1 Drawing Sheet

DEVICE FOR SWIVELING A ROTARY FRAME

BACKGROUND OF THE INVENTION

1. Field of the Invention

The invention relates to a device for rotating a rotary frame supporting at least one reversing roll for a running web.

2. The Prior Art

A device for guiding running webs of material is known from German Patent Application 31 25 852 C1. This device is formed by a rotary frame, on which two rolls are rotatably supported. For this purpose, the rotary frame has two curved guide tracks that cooperate with rollers and are supported in a stationary frame. The curved guide tracks have a common center point of the curvature forming an axis of rotation of the rotary frame. The axis of rotation of the rotary frame is displaceable within wide limits by aligning the guide tracks accordingly. It is also possible with this known device to shift the axis of rotation of the rotary frame to the point where the web of material is running up on the first roll. This results in an advantageous way of influencing the run of the web. This known device is successfully employed in practice. However, a disadvantage is that the guide tracks have to be aligned with each other precisely to obtain rotational motion free of jamming. This is difficult to accomplish especially in conjunction with large rotary frames.

SUMMARY OF THE INVENTION

An object of the present invention is to provide a device that permits swiveling of the rotary frame without obstructing the run of the web, and can be manufactured in a simple manner and at favorable cost.

This and other objects are accomplished by providing a device having a rotary frame supporting at least one reversing roll for a running web. Depending on the position of the axis of rotation of the rotary frame in relation to the running web of material, the reversing roll leads to a sideways shifting of the tension of the web. To obtain control over the run of the web, or over its tension, the axis of rotation of the rotary bearing is located as close as possible to the point where the material web runs up on the reversing roll. To prevent the travel of the web from being obstructed by the pivot bearing of the rotary frame, the bearing is designed in the form of an antifriction bearing that is cut in the form of a segment. The position of the cut through the antifriction bearing is selected in such a way that the material web is closely guided across the surface of the area of the cut extending through the antifriction bearing. Furthermore, the antifriction bearing offers the advantage of a bearing having particularly low friction because the only friction being generated is the rolling friction occurring between the rolling elements of the antifriction bearing and the raceways of the bearing boxes, rotating against each other. It is possible to use any known antifriction bearing, such as ball bearings, cylinder bearings, needle bearings, cone bearings and drum-type bearings. Preferably employed is a standard antifriction bearing that is manufactured in large quantity and thus at favorable cost. The bearing is cut to a segment-like shape so that it does not interfere with the run of the web.

If the device is used for shifting the material web sideways, the material web generally runs up on the reversing roll in the direction of the axis of rotation of the rotary frame. It is advantageous if the antifriction bearing of the rotary frame is cut having an approximately axial section. Therefore, the surface of the cut through the antifriction bearing is aligned approximately parallel to the moving material web so that the greatest area of the antifriction bearing is available for supporting radial bearing forces in accordance with the installation conditions.

It is advantageous to place the axis of rotation of the rotary frame as precisely as possible in the material web running up on the reversing roll. The pivot bearing is cut in such a way that its bearing boxes extend over an angle of less than 180° so that it will not obstruct the run of the web. The axis of rotation is accordingly located outside the antifriction bearing so that the material web passing through the axis of rotation is guided with a spacing from the antifriction bearing. Furthermore, this results in the additional advantage that two cut antifriction bearings can be obtained from one conventional antifriction bearing, whereby each of the bearings comprises an angle of less than 180°.

The antifriction bearing normally has rolling elements in the form of balls, needles or rollers, which are kept spaced apart from one another in a cage. When the bearing boxes of the antifriction bearing are swiveled, the cage has a relative movement in relation to the bearing boxes. To prevent the cage from obstructing the run of the web as this relative movement is taking place, the cage extends over a smaller angle than the bearing boxes. The extent to which the cage has to be cut depends on the position of the material web and the required range of the angle of swivel of the rotary frame. Therefore, the cage is cut shorter when the material web travels closer to the antifriction bearing, and the greater the range of the angle of swivel of the rotary frame. In connection with angles of swivel that are greater than 5°, it is advantageous if the bearing box is cut to a secant- or segment-shaped form.

In cases in which the antifriction bearing comprises an angle of less than 180°, the bearing boxes of the antifriction bearing can no longer be kept against each other without implementing additional measures. If the bearing boxes of the antifriction bearing are radially pressed against each other by either the tensile force of the material web, or by the force of the weight of the rotary frame and the reversing roll, it makes no difference because the bearing boxes are kept against each other by a radially acting force. In other installation positions, it is necessary to hold the bearing boxes of the antifriction bearing against each other with at least one holding means in the form of a sliding component, or with the help of a rotatable roller. This holding means is connected with one of the bearing boxes in a fixed manner and applies pressure to the other bearing box on the side located opposite the rolling elements of the bearing. With installation positions in which the holding means is required to exert only a low force of pressure, the holding means can be realized in the form of a sliding component because the latter will generate only minor forces of friction. However, with higher forces of pressure, designing the holding means in the form of a rotating roller supported on balls is preferable for reducing the frictional forces generated in the present case.

So as to be able to precisely align the holding means vis-à-vis the antifriction bearing, it is favorable if such a holding means is mounted in an adjustable manner on a cam. In this way, the holding means can be aligned versus the antifriction bearing in a very precise way by simply turning the cam. In particular, the sliding component or the roller can be re-adjusted if this should be required due to wear appearing in the course of operation.

In conjunction with large rotary frames, it is not useful when the entire force of its weight is supported in one single pivot bearing because the pivot bearing and the rotary frame would have to be in a very solid form, which in turn would have a negative effect on the masses to be moved. Therefore, to quickly swivel a large rotary frame, it is advantageous if the frame is supported on a support plate by at least one sliding component or at least one roller so that the rotary frame can be designed with a relatively light weight. The sliding component or the roller are spaced from the swivel axis so that good support of the rotary frame is obtained. Preferably, two sliding components or two rollers are provided which in conjunction with the pivot bearing, will result in a highly stable three-point support of the rotary frame. The sliding components or the rollers support forces directed axially in relation to the axis of rotation so that curved guides on the support plate are not needed. This dispenses with the necessity of having to align the support plate precisely on the pivot axis. Therefore, assembly is very simple in spite of the fact that sliding components or rollers are needed.

Finally, it is preferred if the sliding component or the roller is opposed by another sliding component or by another rotating roller for supporting the rotary frame. This additional sliding component or roller is supported on the opposite side of the support plate. In this way, the sliding components or rollers are capable of absorbing axial tensile forces in addition to axial forces of pressure so that the device can be installed and operated overhead as well without causing any problems.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
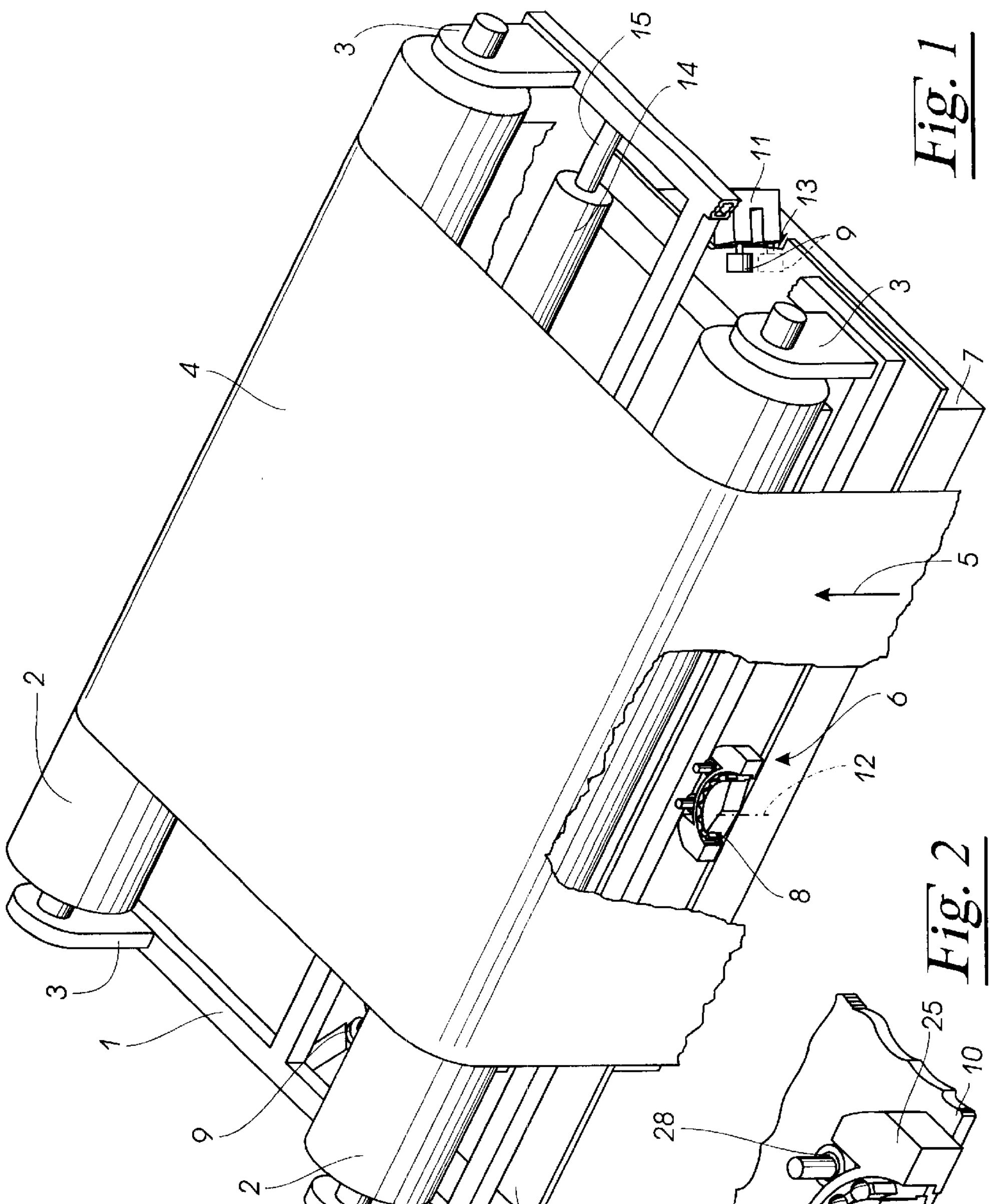
FIG. 1 shows a three-dimensional representation of a rotary frame with a pivot bearing.

Referring now in detail to the drawings and, in particular, FIG. 1 shows a three-dimensional view of a rotary frame 1, on which two reversing rolls 2 are rotatably supported via flanges 3. Alternatively, it is also possible for reversing rolls 2 to be driven by a motor. A material web 4 is guided via reversing rolls 2. Web 4 is reversed on each of reversing rolls 2 by approximately 90°. Material web 4 is moving in the direction 5 toward a front reversing roll 2 and runs off from a rear reversing roll against the running direction 5, and is consequently reversed by 180°. Material web 4 is partially shown in a broken manner to expose the components located underneath.

Rotary frame 1 is pivotably supported by a swiveling device 6 on a rack 7 being designed in the form of a box only as an example. Aggregates such as hydraulic pumps or electronic components for operating the rotary frame 1 are accommodated in rack 7.

Swiveling device 6 for rotating rotary frame 1 is formed by a pivot bearing 8 and support rollers 9 supported on the rotary frame 1 or on a support plate 10. The support plate is located on rack 7. Support rollers 9 are mounted in pairs, whereby each pair is mounted in a fork 11 in a rotating manner and are adjustable. Support rollers 9 enclose support plate 10 between each other. When rotary frame 1 is swivelled around the axis of rotation 12, support rollers 9 roll off on support plate 10 so that forces directed axially in relation to the axis of rotation 12 are absorbed by support rollers 9 with low friction.

Support plate 10 is curved at zone 13, whereby the center point of the curvature of the arc is disposed in the swivel axis 12. In this way, support plate 10 is spaced from two forks 11 by approximately the same distance in all intended positions of swivel. Therefore, forks 11 can contain short legs without running the risk that support rollers 9 might lose contact with support plate 10.

Since support rollers 9 do not have to absorb any radial forces, it is possible to specify very low requirements with respect to the accuracy and alignment of the curved zone 13 of support plate 10. In particular, no exact alignment of the curved zone 13 with respect to the swivel axis 12 is required. At least one of rollers 9 in each of forks 11 is preferably adjustable in the direction of swivel axis 12 so that their play can be compensated.

To actively swivel rotary frame 1 about swivel axis 12, a hydraulic cylinder 14 is supported on rack 7 and a piston rod 15 engages rotary frame 1 on the inner side. Alternatively, instead of a hydraulic cylinder 14, it is possible also to employ a pneumatic cylinder or an electric drive.

Figure 2:
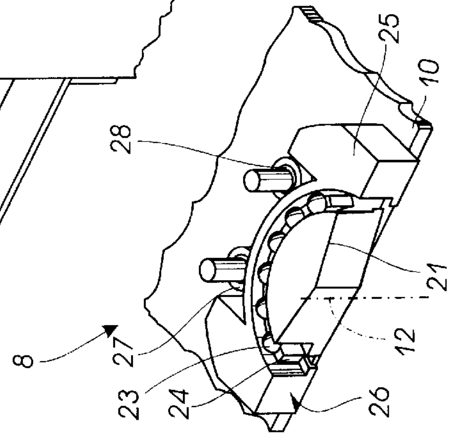
FIG. 2 is a three-dimensional representation of the pivot bearing, which has been enlarged as compared to FIG. 1.

The structure and the mode of operation of pivot bearing 8 are shown in FIG. 2. Pivot bearing 8 is mounted in a fixed manner on support plate 10 of rack 7. An inner bearing box 21 of pivot bearing 8 is connected to support plate 10 of rack 7 via a holding means (not shown), preferably having the form of screws. A hardened running surface (not shown) is preferably attached to an inner bearing box 21 on which rolling elements 23 roll off. Rolling elements 23 are accommodated in a cage 24 and are spaced apart from each other so that rolling elements 23 exclusively generate rolling friction. On the outer side, rolling elements 23 roll off on a hardened raceway of an outer bearing box 25, which is pivot-mounted compared to inner bearing box 21. Outer bearing box 25 rotates around swivel axis 12.

Inner bearing box 21 and outer bearing box 25 are cut along a section area 26. Axis of rotation 12 is located within the area of bearing boxes 21, 25 that has been cut off. In addition, inner bearing box 21 is fixedly connected to support plate 10, and is cut in the shape of a segment so that it will not interfere with the movement of the web when rotary frame 1 is swivelled. Therefore, bearing boxes 21, 25 comprise less than half of a full circle so that pivot bearing 8 does not in any way interfere with the run of the material web 4 as it moves through swivel axis 12. On outer bearing box 25, rotary frame 1 is fixed by means of holding elements (not shown), such as screws. Rotary frame 1 is pivot-mounted and swivels about swivel axis 12.

To safely keep bearing boxes 21, 25 of pivot bearing 8 against one another at less than 180° in spite of the cut, rollers 27 are rotatably mounted on support plate 10 of rack 7. Rollers 27 are supported in cams 28. When cams 28 are turned, the spacing of the rollers 27 from outer bearing box 25 will change accordingly. The force of the contact pressure exerted by rollers 27 consequently can be adjusted in accordance with the requirements and adapted also at a later time.

Accordingly, while only a few embodiments of the present invention have been shown and described, it is obvious that many changes and modifications may be made thereunto without departing from the spirit and scope of the invention.

What is claimed is:

1. A device for swiveling a rotary frame supporting at least one reversing roll for moving a material web, comprising:

a rack (7) for pivot-mounting the rotary frame (1); and an anti-friction pivot bearing (8) disposed on the rack (7) for swiveling the rotary frame (1) about a swivel axis (12), the bearing (8) shaped being as a segment of a circle, and wherein the material web is guided close to the swivel axis.

2. The device according to claim 1, wherein the segment of the circle of the antifriction bearing (8) includes a wall extending radially from the swivel axis.

3. The device according to claim 1, further comprising bearing boxes (21, 25) disposed on the antifriction pivot bearing (8) and extending across an angle of less than 180°.

4. The device according to claim 3, wherein the antifriction pivot bearing (8) comprises a rolling element (23); and a cage (24), for holding said rolling element (23), wherein said cage extends over a smaller angle than said bearing boxes (25).

5. The device according to claim 3, further comprising at least one holding means (27) for attaching said bearing boxes (21, 25) to each other, wherein said bearing boxes rotate against each other.

6. The device according to claim 5, wherein said holding means comprises a sliding component.

7. The device according to claim 6, further comprising a support plate (9) for supporting the rotary frame; and a device for mounting said support plate on the rack such that it is spaced from the swivel axis (12).

8. The device according to claim 7, wherein said sliding component is opposed by a second sliding component being supported on the opposite side of the support plate (9).

9. The device according to claim 5, wherein said holding means comprises a rotatable roller (27).

10. The device according to claim 5, further comprising a cam (28) for adjustably mounting said holding means (27) thereon.

* * * * *